(12) United States Patent
Kim et al.

(10) Patent No.: US 9,113,319 B2
(45) Date of Patent: Aug. 18, 2015

(54) METHOD OF GENERATING A VIRTUAL PRIVATE COMMUNITY AND NETWORK USING THE VIRTUAL PRIVATE COMMUNITY

(75) Inventors: Jae Hoon Kim, Yongin-si (KR); Ki Ho Kim, Seoul (KR); Myeong Wuk Jang, Seoul (KR); Byoung Joon Lee, Seongnam-si (KR); Mi Suk Huh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 13/176,905

(22) Filed: Jul. 6, 2011

(65) Prior Publication Data

US 2012/0011363 A1  Jan. 12, 2012

(30) Foreign Application Priority Data

Jul. 6, 2010  (KR) .................. 10-2010-0064705

(51) Int. Cl.
*G06F 7/04* (2006.01)
*H04W 4/20* (2009.01)
*G06Q 10/10* (2012.01)
*H04L 29/06* (2006.01)
*H04W 12/06* (2009.01)

(52) U.S. Cl.
CPC .............. *H04W 4/20* (2013.01); *G06Q 10/10* (2013.01); *H04W 4/206* (2013.01); *H04L 63/0823* (2013.01); *H04W 12/06* (2013.01)

(58) Field of Classification Search
CPC ... H04L 63/0823; H04W 12/06; H04W 12/20
USPC .................. 726/15, 3; 713/168; 370/392, 401
See application file for complete search history.

(56) References Cited

U.S. PATENT DOCUMENTS

| | | | |
|---|---|---|---|
| 7,852,861 B2 * | 12/2010 | Wu et al. ................. 370/401 |
| 8,196,181 B2 * | 6/2012 | Devonshire et al. ............ 726/3 |
| 2007/0271234 A1 | 11/2007 | Ravikiran |
| 2008/0133445 A1 | 6/2008 | Pennington |
| 2008/0144625 A1 | 6/2008 | Wu et al. |
| 2009/0215469 A1 | 8/2009 | Fisher et al. |
| 2009/0259485 A1 | 10/2009 | Perlman et al. |
| 2009/0312033 A1 | 12/2009 | Shen et al. |

FOREIGN PATENT DOCUMENTS

| | | |
|---|---|---|
| KR | 10-0860413 | 9/2008 |
| KR | 10-0953594 | 4/2010 |
| WO | WO 2009/127904 A1 | 10/2009 |

OTHER PUBLICATIONS

Extended European Search Report issued Oct. 27, 2011, in counterpart European Application No. 11172523.0 (7pp.).

* cited by examiner

*Primary Examiner* — Samson Lemma
(74) *Attorney, Agent, or Firm* — NSIP Law (57) ABSTRACT

Provided is a method of generating a user-oriented virtual private community without the need for a server. The method includes generating a first virtual private community for a predetermined user including at least one communication device of the predetermined user.

10 Claims, 8 Drawing Sheets

METHOD OF GENERATING A VIRTUAL PRIVATE COMMUNITY AND NETWORK USING THE VIRTUAL PRIVATE COMMUNITY

CROSS-REFERENCE TO RELATED APPLICATION(S)

This application claims the benefit under 35 U.S.C. §119 (a) of Korean Patent Application No. 10-2010-0064705, filed on Jul. 6, 2010, in the Korean Intellectual Property Office, the entire disclosure of which is incorporated herein by reference for all purposes.

BACKGROUND

1. Field

The following description relates to a method of generating a virtual private community and a network using the virtual private community.

2. Description of Related Art

An application and communication device may provide a social network service. The social network service may provide a community type website that enables a user to add friends or personal connections, and also allows the user to share various information through the community type website.

To provide the social network service, typically a server is used and the users that use the social network service access the service through the server.

SUMMARY

In one general aspect, there is provided a method for generating a user-oriented virtual private community, the method including generating a first virtual private community for a predetermined user comprising at least one communication device of the predetermined user.

The method may further comprise generating, as a higher level community in comparison to the first virtual private community, a second virtual private community including the first virtual private community as a member.

The second virtual private community may further include another first virtual private community corresponding to a user authorized by the predetermined user.

The first and second virtual private communities may each have a unique virtual community identifier.

The at least one communication device included in the first virtual private community may generate a hierarchical content name using the virtual community identifier of each of the first and second virtual private communities, and a content name included in the at least one communication device, and the hierarchical content name may comprise the virtual community identifier of each of the first and second virtual private communities, and the content name included in the at least one communication device.

The members of the second virtual private community may share a content sharing service or a social networking service.

The method may further comprise generating a third virtual private community including the second virtual private community and another second virtual private community as members.

The first virtual private community, the second virtual private community, and the third virtual private community may each have a unique virtual community identifier.

The at least one communication device included in the first virtual private community may generate a hierarchical content name using the virtual community identifier of each of the first virtual private community, the second virtual private community, and the third virtual private community, and a content name included in the at least one communication device, and the hierarchical content name may comprise the virtual community identifier of each of the first virtual private community, the second virtual private community, and the third virtual private community, and the content name included in the at least one communication device.

The at least one communication device may perform a self-secure association using a security key generated based on a public key.

A new communication device may join at least one of the first virtual private community, the second virtual private community, and the third virtual private community, and may perform association using the public key and the security key.

The method may further comprise generating, by the predetermined user, a fourth virtual private community that is hierarchically independent of the second virtual private communities and the third virtual private community.

The method may further comprise generating, by members of the fourth virtual private community, a public key for the fourth virtual private community, and generating, by the members of the fourth virtual private community, a security key for the fourth virtual private community, using the public key for the fourth virtual private community.

In another aspect, there is provided an operating method of a communication device communicating in a virtual private community, the method including acquiring a virtual community identifier of the virtual private community from another communication device that is included in the virtual private community, and generating a hierarchical content name including a virtual community identifier of the virtual private community and a content name included in the communication device.

The method may further comprise generating a public key for the virtual private community, generating a security key of the virtual private community based on the public key, and performing a self-secure association with another communication device of the virtual private community using the security key.

The method may further comprise providing the public key or the security key to another communication device of another virtual private community that requests association with the communication device, and performing association with the other communication device of the other virtual private community using the public key or the security key.

In another aspect, there is provided an operation method of a communication device communicating in a network of virtual private communities, wherein the virtual private communities comprise a first virtual private community and a second virtual private community including the first virtual private community as a member, the method including acquiring virtual community identifiers of the first and second virtual private communities, and processing a content request received from another communication device using the virtual community identifiers of the first and second virtual private communities.

The processing may comprise performing association with a communication device that has the content, using the virtual community identifiers of the first and second virtual private communities.

The processing may comprise generating a routing path between the communication device that has the content and another communication device that requests the content, using the virtual community identifiers of the first and second virtual private communities.

The method may further comprise transmitting, to members of the second virtual private community, a public key to recognize the communication device as a hub.

The method may further comprise detecting a change in contents included in members of the second virtual private community, and acquiring the changed contents from the members of the second virtual private community.

The method may further comprise performing, with members of the second virtual private community, one of a synchronization, a push, and a content search.

The method may further comprise managing information about members of the second virtual private community and information about contents included in the members of the second virtual private community.

The method may further comprise exchanging communication environment information with other virtual private communities that are outside of the second virtual private community, to perform communication with the other virtual private communities.

The communication environment information may comprise information about virtual community identifiers and contents included in members of the second and other virtual private communities.

In another aspect, there is provided a computer-readable storage medium having stored therein program instructions to cause a processor to implement a method for generating a user-oriented virtual private community, the method including generating a first virtual private community for a predetermined user comprising at least one communication device of the predetermined user.

In another aspect, there is provided a virtual private community network, including at least one communication device to generate a hierarchical content name using a content name and a virtual community identifier of each of a first virtual private community and a second virtual private community including the first virtual private community as a member, and at least one hub to process a content request received from a communication device using the hierarchical content name.

In another aspect, there is provided a communication device communicating in a virtual private community, the communication device including an interface to receive a unique virtual community identifier indicating a hierarchical structure of the virtual private community acquired from another communication device included in the virtual private community, a processor to generate a hierarchical content name including a virtual community identifier of the virtual private community and a content name included in the communication device, and a memory to store the virtual community identifier and the hierarchical content name.

The processor may comprise a security key generation module to generate a public key for the virtual private community, and to generate a security key of the virtual private community based on the public key, and an association module to perform a self-secure association with another communication device of the virtual private community using the security key.

The security key generation module may provide the public key or the security key to another communication device of another virtual private community that requests association with the communication device.

The association module may perform association with the other communication device of the other virtual private community using the public key or the security key.

In another aspect, there is provided a communication device communicating in a network of virtual private communities, wherein the virtual private communities comprises a first virtual private community and a second virtual private community including the first virtual private community as a member, the communication device including an interface to receive a hierarchical content name comprising virtual community identifiers indicating hierarchical structures of the first and second virtual private communities, a processor to process a content request received from the another communication device using the hierarchical content name, and a memory to store the virtual community identifiers.

The processor may comprise an association module to perform association with a communication device that has the content, using the virtual community identifiers of the first and the second virtual private communities.

The processor may comprise a routing module to generate a routing path between the communication device that has the content and the another communication device that requests the content, using the virtual community identifiers of the first and the second virtual private communities.

The communication device may further comprise a monitoring module to detect a change in contents included in members of the second virtual private community, wherein the processor acquires the changed content from the members of the second virtual private community.

The processor may perform at least one of a synchronization, a push, and a content search, with members of the second virtual private community.

The processor may manage information about members of the second virtual private community, and information about contents included in the members of the second virtual private community.

The interface may transmit, to members of the second virtual private community, a public key to recognize the communication device as a hub.

The interface may exchange communication environment information with other virtual private communities that are outside of the second virtual private community to perform communication with the other virtual private communities.

The communication environment information may comprise information about virtual community identifiers and contents included in members of the second and other virtual private communities.

In another aspect, there is provided a device for a virtual private network configured in a user-oriented manner independent of a service provider, and which allows devices of the virtual private network to share content, the device including an interface configured to perform a server-less association with a second device to generate a first virtual private community included in the virtual private network, such that the first virtual private community includes at least the device and the second device, and a processor to generate content for sharing with other devices included in the first virtual private community.

The interface may receive a virtual community identifier from the second device that indicates a hierarchical structure of the first virtual private community, and the processor may use the virtual community identifier and content name to generate the content for sharing with the other devices included in the virtual private group.

The virtual private network may include a hierarchical community that includes the first virtual private community and a second virtual private community that encompasses the first virtual private group and that has a higher level of hierarchy in comparison to the first virtual private community.

The second virtual private community may comprise a plurality of first virtual private communities.

The virtual private network may include a third virtual private community that encompasses the second virtual private community and that has a higher level of hierarchy in comparison to the first and second virtual private communities.

The interface may receive a request from the second device requesting to join the first virtual private community, and the interface may transmit a security key to the second to device to perform the server-less association with the second device.

The interface may transmit a request to the second device requesting to join the first virtual private community, and the interface may receive a security key from the second device to perform the server-less association with the second device to join the first virtual private community.

The first virtual private community may include the second device and a plurality of other devices, and in response to performing association with the second device, the device may also become associated with the plurality of other devices.

The device may be a hub that forms the first virtual private community, performs member management corresponding to devices that are members of the first virtual private community, and performs content management of the members.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Figure 1:
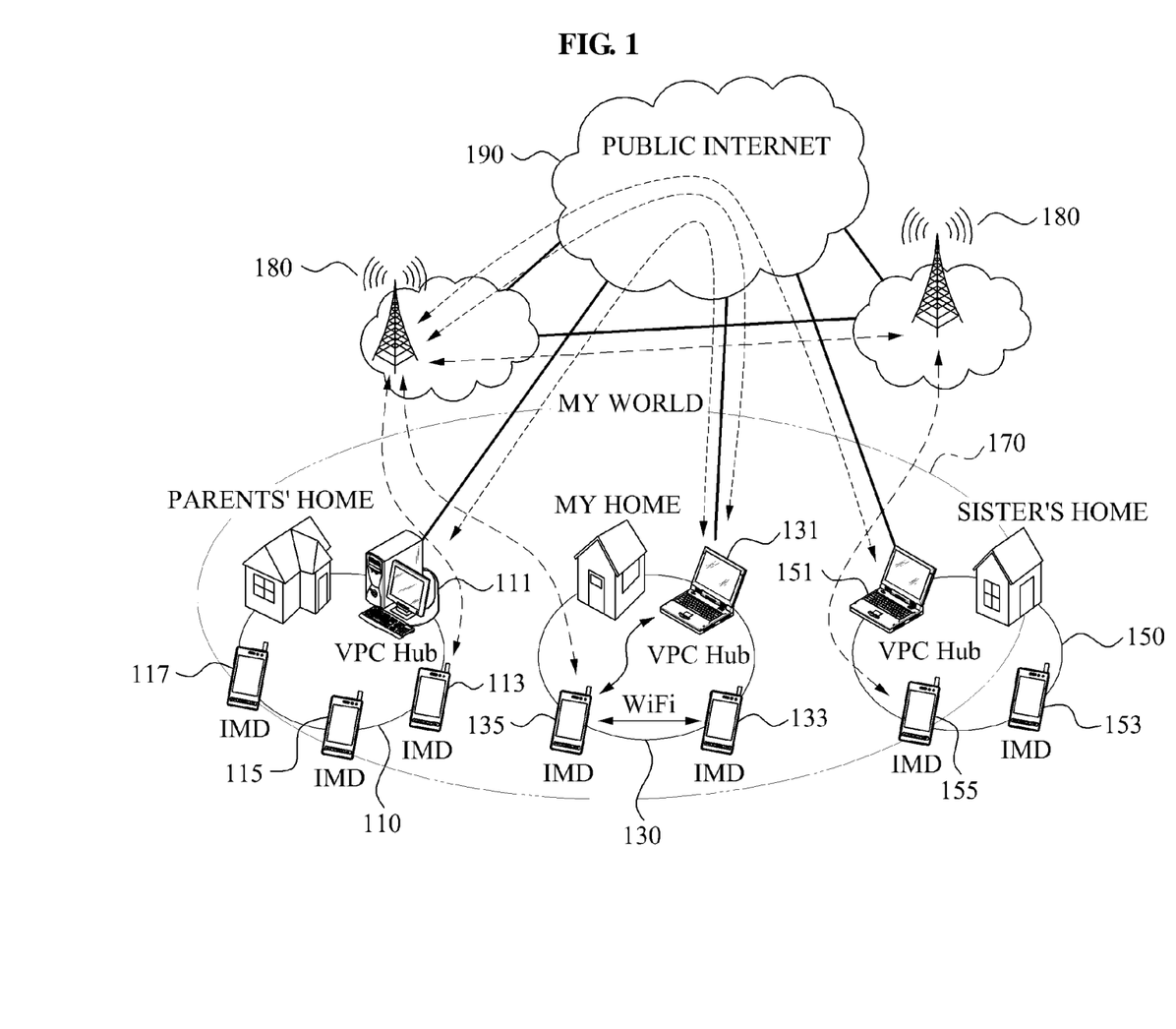
FIG. 1 is a diagram illustrating an example of a network that includes user-oriented virtual private communities.

FIG. 1 illustrates an example network that includes user-oriented virtual private communities.

Referring to FIG. 1, the network of the user-oriented virtual private communities may include various virtual private communities, for example, one or more first virtual private communities, a plurality of second virtual private communities 110, 130, and 150, a third virtual private community 170, a mobile operator 180, and the Internet 190.

The user-oriented virtual private community may correspond to a virtual community that generates and transmits a content request message that expresses an interest of a user as content to acquire the content requested by the user in the virtual private community.

The user-oriented virtual private community may enable various services to be shared between acquaintances by supporting the generation of a virtual private community. For example, a relationship between family members and relatives formed offline may be maintained online.

The virtual private community may be an online community generated in a user-oriented manner. The virtual private community is not limited by a boundary of an infrastructure, and may provide a service regardless of a boundary. The virtual private community may include various types of hierarchical or non-hierarchical communities. In this example, the "non-hierarchical communities" may indicate horizontal communities.

By providing a user-desired content within, the user-oriented virtual private community may provide a more effective sharing and social networking service in a user-friendly manner while at the same time preventing personal information from being exposed. Information may be shared only between the users or members of the virtual private community. Accordingly, the personal information of the users or members of the virtual private community may be prevented from being inadvertently leaked by a service provider or through the hacking of an external server.

The virtual private community may be a virtual community configured in a user-oriented manner that is independent of a service provider, and may be generated in a form of distributed structure. For example, the virtual private community may be classified into a first virtual private community, second virtual private communities 110, 130, and 150, third virtual private community 170, and the like, based on the size and characteristic of the community.

The first virtual private community may be a first-level elementary community and may include one or more communication devices. The communication devices included in the first virtual private community may be for multiple users or a single user. In other words, the first virtual private community may include multiple users that each has one or more communication devices or a single user that has one or more communication devices. In the case of a single user, the first virtual private community may be identified as the user. The single user may have a single communication device, instead of multiple devices. In this example, the first virtual private community includes only a single communication device. The communication devices included in the first virtual private community may perform a server-less and self-secure association between them. Through self-secure association, the communication devices may securely communicate via an encrypted link established directly between them without the use of a third party. Referring to FIG. 1, one or more of the communication devices 113, 115, and 117 belonging to multiple users or a single user may configure the first virtual private community.

As described herein the communication device may be a terminal, for example, a computer, a mobile terminal, a smart phone, a MP3 player, a personal digital assistant (PDA), a tablet, a sensor, an intelligent mobile device (IMD), and the like. The communication device may be wireless or wired devices that include a networking function.

As an example, the sensor device may be combined with a more advanced security technology and may be applied to an e-health system and/or a smart home.

In various examples, the first virtual private community may include at least one communication device for a single user. For example, in the parents' home shown in FIG. 1, a communication device 111 may be a computer that belongs to a father, the communication device 113 may be a mobile device that belongs to the father, the communication device 115 may be a PDA that belongs to a mother, and the communication device 117 may be a mobile device that belongs to the mother.

In this example, the first virtual private community may be generated to include communication device 111 and the communication device 113 for the father, and another first virtual private community may be generated to include communication device 115 and the communication device 117 for the mother.

For example, the communication device 111 and the communication device 113 for the father included in the first virtual private community may perform a self-secure association between them. The communication device 115 and the communication device 117 for the mother in the other first virtual private community may also perform a self-secure association between them.

The plurality of second virtual private communities 110, 130, and 150 may correspond to a higher level community in comparison to the first virtual private communities, and may share a content sharing service and/or a social networking service.

The second virtual private community 110 may include a hub 111 and the communication devices 113, 115, and 117. Also, the second virtual private community 130 may include a hub 131 and communication devices 133 and 135, and the second virtual private community 150 may include a hub 151 and communication devices 153 and 155.

The communication devices 111, 131, and 151 that are in the parents' home, my home, and the sister's home, may respectively belong to a first virtual private community, and may operate as a hub of a second virtual private community. Further descriptions thereof are made hereinafter.

The second virtual private communities 110, 130, and 150 may have a size that corresponds to a home unit such as, parents' home, my home, and sister's home as illustrated in FIG. 1. In this example, a home unit community is presented merely as an example and it should be appreciated that the size of the second virtual private communities 110, 130, and 150 is not limited to a home unit.

The second virtual private communities 110, 130, and 150 may include a predetermined user of the first virtual private community as a member and users authorized by the predetermined user as members.

For example, in the case of the parents' home, the father and mother that each has at least one communication device may be the members of the second virtual private community. For example, in my home, the user may own a laptop computer 131 that acts as the hub and a smart phone 133, and a spouse of the user may own a smart phone 135. In this example, my laptop 131 and smart phone 133 may be members of the first virtual private community, and my spouse's smart phone 135 may be a member of another first virtual private community. Instead of communication devices belonging to a user and the user's spouse, the user and the spouse may be considered as members of the second virtual private community. The user's spouse may be a user that is an authorized member of the second virtual private community by the user.

The third virtual private community 170 may be a highest level community generated by mutual association of second virtual private communities 110, 130, and 150, and may have a size that corresponds to "my world" as illustrated in the example of FIG. 1.

The third virtual private community 170 may include the second virtual private communities 110, 130, and 150 as members. The members of the third virtual private community 170 may perform an association through the hubs 111, 131, and 151.

For example, information about each of the second virtual private communities corresponding to the members of the third virtual private community 170 may be exchanged and shared through the hubs 111, 131, and 151. For example, the information about the second virtual private communities may include information about members of the second virtual private community and information about a content included in the members of the second virtual private community.

The virtual private community may be easily extended to a wider hierarchical or non-hierarchical virtual private community such as a fourth virtual private community, a fifth virtual private community, and the like, for example, based on a desire of the user to extend the community size.

Figure 2:
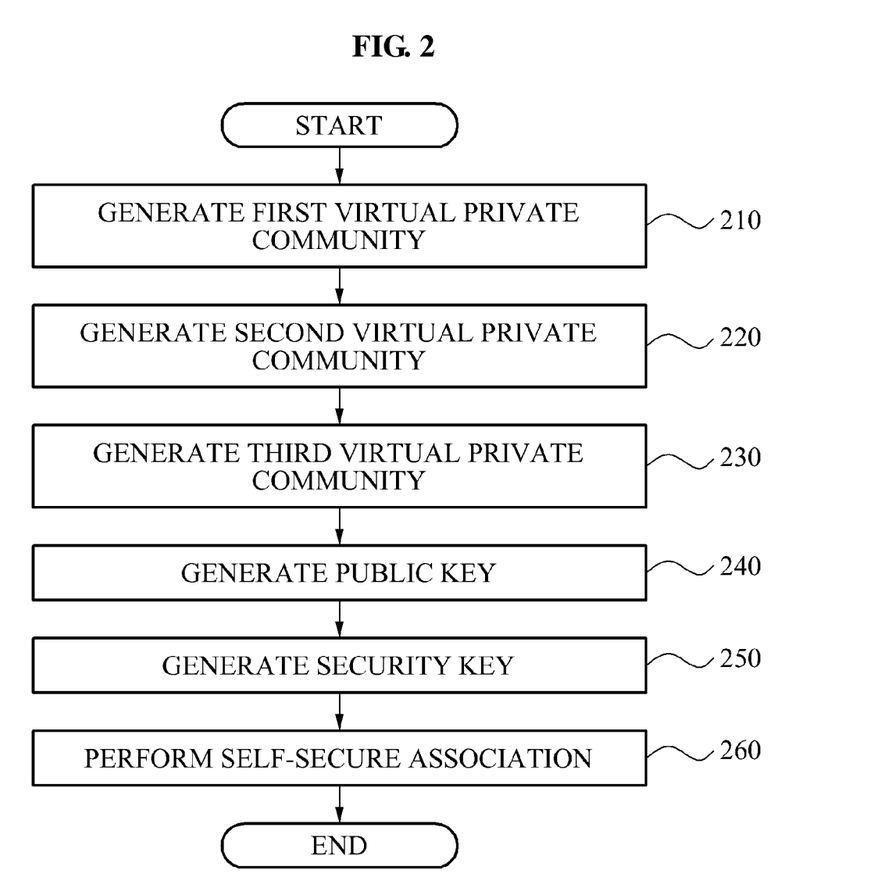
FIG. 2 is a flowchart illustrating an example of a method for generating a user-oriented virtual private community.

FIG. 2 illustrates an example of a method for generating a user-oriented virtual private community.

Referring to FIG. 2, in 210, a first virtual private community for a predetermined user is generated. The user may include one or more communication devices. The at least one communication device may generate a hierarchical content name using a virtual community identifier of the first virtual private community and a content name included in the at least one communication device. For example, the hierarchical content name may hierarchically include the virtual community identifier of the first virtual private community and the content name included in the at least one communication device.

For example, the virtual community identifier of the first virtual private community may correspond to "Jones", the first virtual private community may include a cell phone, a laptop computer, and a PDA, and the cell phone may include content "abc.mpeg".

In this example, the cell phone included in the first virtual private community may generate the hierarchical content name "Jones/cellphone/abc.mpeg" using the virtual community identifier "Jones" of the first virtual private community and the content name "abc.mpeg" included in the cell phone. As another example, the hierarchical content name may be "Jones/abc.mpeg". That is, the name of the communication device may or may not be included in the hierarchical content name.

As described herein, a communication device included in each virtual private community may generate the virtual community identifier using community information, member information, and the like, and may generate the hierarchical content name using the virtual community identifier and the content name. For example, the information may correspond to a name.

In 220, a second virtual private community is generated as a higher level community in comparison to the first virtual private community. Members of the second virtual private community may share a content sharing service and/or social networking service. The second virtual private community may include a predetermined user and members corresponding to users that are authorized by the predetermined user.

In 230, a third virtual private community is generated as a higher level community in comparison to the first and second virtual private communities. Members of the third virtual private community may perform an association through a predetermined communication device or hub, and may share information about the second virtual private communities.

Each of the first virtual private community, the second virtual private community, and the third virtual private community may have a unique virtual community identifier that indicates a hierarchical structure. For example, a communication device may generate the hierarchical content name using the content name and the virtual community identifier of each of the first virtual private community, the second virtual private community, and the third virtual private community.

A communication device may generate content, and it may also generate a hierarchical content name including the community information and the content name. For example, if a communication device belongs to a first virtual private community corresponding to a user member and the member belongs to a second virtual private community, the hierarchical content name may be "(second virtual private) community name/member name/content name" or "(second virtual private) community name/member name/name of the communication device/content name".

The community name, member name, and content name that are expressed for the hierarchical content name may have the form of, for example, "parents' home/Jones (father's name)/abc.txt". The hierarchical structure indicated by the hierarchical content name may be used for configuring a transmission path of a content request message.

As an example, the virtual private community may be expressed as an intuitive and user-friendly virtual community identifier such as "my home" or "my world" of FIG. 1, and the members of each virtual private community may have a unique virtual community identifier that indicates the hierarchical structure.

By using the unique virtual community identifier indicating the hierarchical structure, each virtual private community may more easily generate a routing path of the content request message and the transmission path of the content. Upon generating the routing of the content request message and the transmission path of the content, the virtual private community may exchange information about the virtual private community together with the virtual community identifier of each virtual private community. The information about the virtual private community may include, for example, information about the members of the virtual private community, a content list, and the like.

A member may generate content, and may also generate the hierarchical content name including the community information. For example, the hierarchical content name may include community information, member information, and content information such as "community name/member name/content name" or "community name/member name/name of the communication device/content name". The hierarchical content name may be expressed as, for example, alice_world/alice_home/alice/wild.jpg or alice_world/alice_home/alice/cellphone/wild.jpg, and the like.

The name "alice_world" may correspond to a name of a highest level virtual private community (for example, a third virtual private community), the name "alice_home" may correspond to a name of a second highest level virtual private community (for example, a second virtual private community), the name "alice" may correspond to a name of an elementary unit virtual private community (for example, a first virtual private community), "cellphone" may correspond to a communication device that belongs to "alice", and "wild.jpg" may correspond to a content name included in the elementary unit virtual private community or communication device.

In 240, a communication device generates a public key for each of the first virtual private community, the second virtual private community, and the third virtual private community.

In 250, a communication device generates a security key for each of the first virtual private community, the second virtual private community, and the third virtual private community, based on the public key generated in 240.

In 260, the members or the communication devices included in the first virtual private community, the second virtual private community, and the third virtual private community, perform a self-secure association between them using the security key.

A new member or a new communication device that joins one of the first virtual private community, the second virtual private community, and the third virtual private community may perform an association with a single member from among members of the first virtual private community, the second virtual private community, and the third virtual private community. For example, the association may be performed using a credential of each of the first virtual private community, the second virtual private community, and the third virtual private community.

Figure 3:
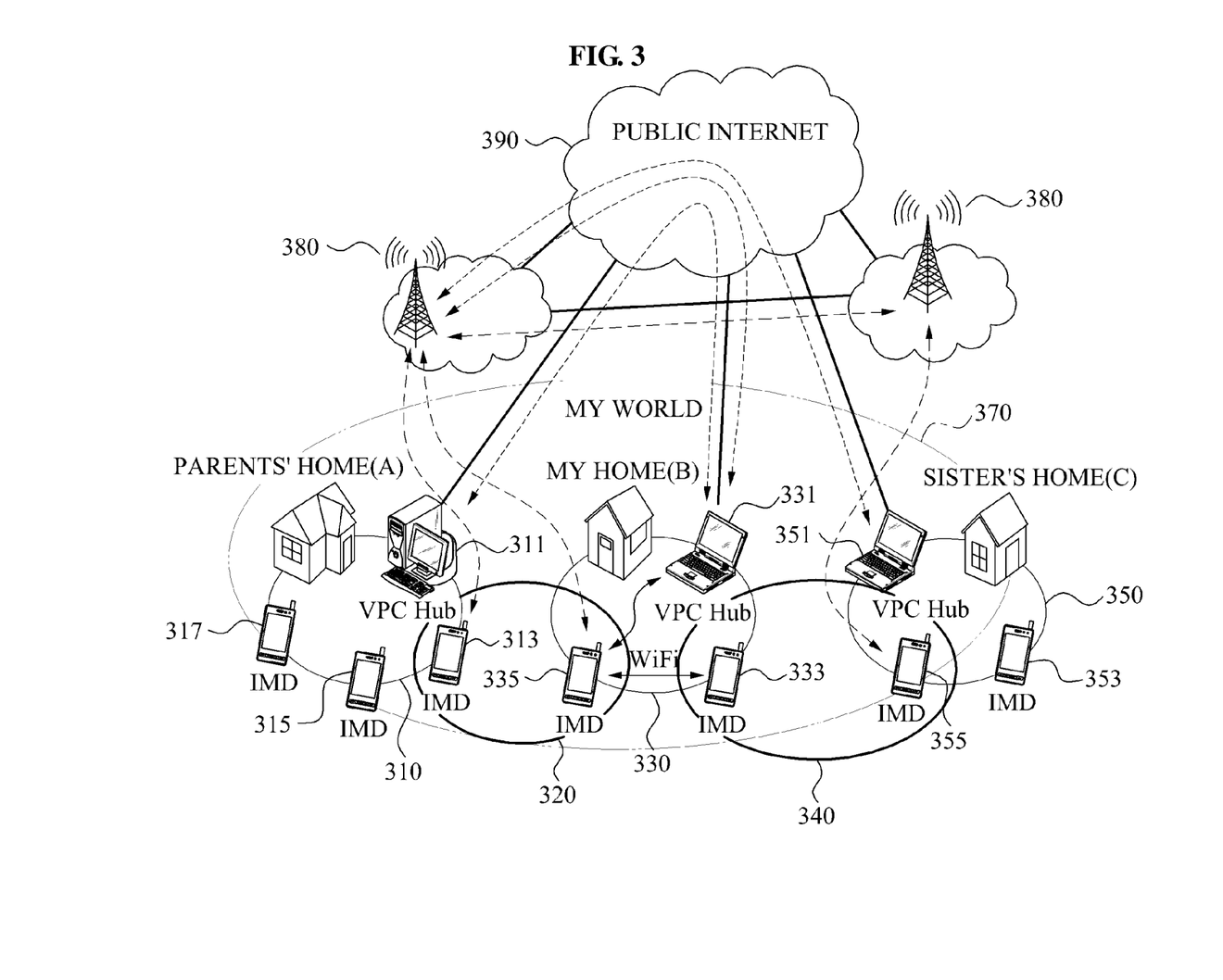
FIG. 3 is a diagram illustrating an example of a member of a virtual private community and a member of another virtual private community configuring a new virtual private community.

FIG. 3 illustrates an example of a member of a virtual private community and a member of another virtual private community configuring a new virtual private community.

Referring to FIG. 3, a network of user-oriented virtual private communities includes a plurality of second virtual private communities (A, B, and C) 310, 330, and 350, a third virtual private community 370, a mobile operator 380, and the Internet 390.

The second virtual private community (A) 310 includes a hub 311 and communication devices 313, 315, and 317. The second virtual private community (B) 330 includes a hub 331 and communication devices 333 and 335. The second virtual private community (C) 350 includes a hub 351 and communication devices 353 and 355.

In generating the user-oriented hierarchical virtual private communities, other plurality of virtual private communities that are independent of a boundary of the hierarchical communities may be generated.

In this example, communication devices 313 and 315 originally belong to second virtual private community (A) 310 and (B) 330, respectively. For example, the communication device 313 and the communication device 335 may perform an association with each other beyond the hierarchical boundary of the second virtual private community (A) 310 and the second virtual private community (B) 330 to generate another virtual private community, for example, a fourth virtual private community 320.

In this example, a user using the communication device 313 belonging to the second virtual private community (A) 310 may generate a new fourth virtual private community 320 with another user using the communication device 335 of the second virtual private community (B) 330.

The new fourth virtual private community 320 may correspond to a non-hierarchical virtual private community that is not subjected to a boundary of the already configured second virtual private communities or third virtual private community.

Members of the new fourth virtual private community 320 may generate and exchange a public key. The members may also generate a security key using the public key for the new fourth virtual private community 320.

New virtual private communities 320 and 340 of FIG. 3 that are independent of the existing hierarchical second virtual private communities may provide a predetermined access control and security setting that conform to a characteristic of the newly generated virtual private communities.

The new fourth virtual private community 320 or 340 may provide a limited access control and security setting only for itself. For example, the communication device 333 may belong to a son of "my home", and the communication device 355 may belong to a son of my sister, that is, the nephew of "my sister's home".

For example, the son of the user and the son of the user's sister may desire to share confidential information that they desire to keep from other family members, and may configure a new virtual private community that is different from the existing hierarchical second virtual private communities.

In this example, the new virtual private community may maintain security and allow access to its members only, and may prevent other members from accessing the new virtual private community using a new public key and a new security key.

The new virtual private community may be beyond the boundary of the highest level virtual private community, which in the example of FIG. 3 is the third virtual private community 370.

The new virtual private community may be generated in the form of a hierarchical community, instead of a non-hierarchical community. A security key management technology that is based on a dispersion structure may be used to configure various forms of a community.

The security key described herein may be generated using the public key for each virtual private community and may be referenced for the security key management technology based on the dispersion structure.

Figure 4:
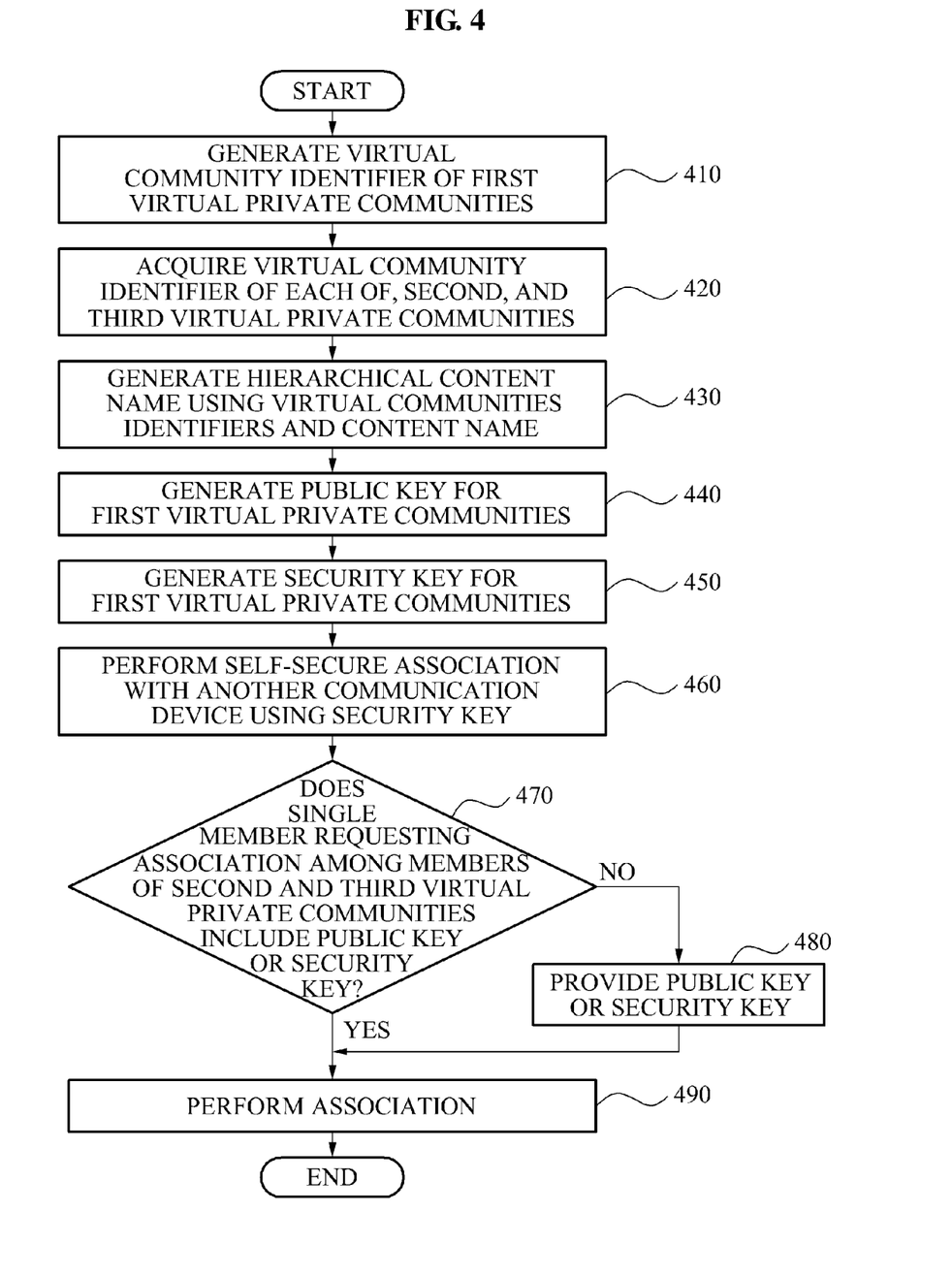
FIG. 4 is a flowchart illustrating an example of a method of a communication device in a virtual private community.

FIG. 4 illustrates an example of a method of a communication device in a virtual private community.

In various examples, a communication device may acquire a virtual community identifier of a first virtual private community from another communication device that is included in the first virtual private community, and may generate a hierarchical content name using the virtual community identifier and a content name included in the communication device. As another example, instead of acquiring the virtual community identifier from another communication device, the communication device may generate the virtual community identifier.

The first virtual private community may correspond to a predetermined user that has one or more communication devices. The hierarchical content name may hierarchically include the virtual community identifier of the first virtual private community and the content name.

In this example, the communication device may generate a public key for the first virtual private community, and may generate a security key of the first virtual private community based on the public key. The communication device may perform a self-secure association with another communication device of the first virtual private community, using the security key. An example of a self-secure association performed by the communication device with another communication device is further described with reference to FIG. 5.

The virtual private community may further include a second virtual private community that is a higher level community in comparison to the first virtual private community. As another example, the virtual private community may include a third virtual private community that is a higher level community in comparison to the first and second virtual private communities.

Members of the second virtual private community may share a content sharing service and/or social networking service. Members of the third virtual private community may perform an association through a predetermined communication device and may share information about the second virtual private communities.

As described herein, a communication device may generate or acquire the virtual community identifiers of the first and second virtual private communities from another communication device that are included in each of the first and second virtual private communities. Thereafter, the communication device may generate the hierarchical content name using the content name and the virtual community identifier of each of the first and second virtual private communities.

The hierarchical content name may hierarchically include the content name and the virtual community identifier of each of the first and second virtual private communities.

As another example, a communication device may generate or acquire the virtual community identifiers of the first, second, and third virtual private communities from another communication device that is included in each of the first, second, and third virtual private communities, and may generate the hierarchical content name using the content name and the virtual community identifier of each of the first, second, and third virtual private communities. For example, the hierarchical content name may hierarchically include the virtual community identifier of each of the first, second, and third virtual private communities.

Hereinafter, an operating method of a communication device that communicates in each of the first, second, and third virtual private communities is described.

Referring to FIG. 4, in 410, a communication device generates a virtual community identifier of the first virtual private community. The first virtual private community may correspond to a predetermined user, the second virtual private community may be a higher level community than that of the first virtual private community, and the third virtual private community may be a higher level community than that of the second virtual private community and the first virtual private community.

For example, the first virtual private community may include, as a member, one or more communication devices of the predetermined user. The members of the second virtual private community may share a content sharing service and/ or social networking service. The members of the third virtual private community may perform the association through a predetermined communication device, and may share information about the second virtual private communities.

In 420, the communication device acquires the virtual community identifier of each of the second virtual private community and the third virtual private community from another communication device that belongs to both of the second virtual private community and the third virtual private community.

In FIG. 4, operations 410 and 420 illustrate an example in which a communication device generates a virtual community identifier of the first virtual private community itself and acquires the virtual community identifiers of the second and third virtual private communities from another communication device. As another example, the communication device may generate each of the virtual community identifiers itself or may acquire one or more of the virtual community identifiers from one or more other communication devices.

In 430, the communication device generates a hierarchical content name using a content name and the virtual community identifier of each of the first, second, and third virtual private communities. The hierarchical content name may be used to hierarchically indicate the virtual community identifier of each of the first, second, and third virtual private communities.

In 440, the communication device generates a public key for the first virtual private community. Thereafter, in 450, the communication device generates a security key of the first virtual private community, based on the public key.

In 460, the communication device performs self-secure association with another communication device of the first virtual private community, using the security key.

In 470, the communication device determines whether a single member requesting association with the communication device, from among the members of the second and third virtual private communities, includes the public key and the security key for the first virtual private community. If the single member requesting association with the communication device includes the above-mentioned public key and security key, in 490 the communication device performs association with the single member using the public key and the security key.

However, if the single member does not include the public key or the security key of the first virtual private community, the communication device may enable the association to be performed in 490 by providing, to the single member, the public key or the security key of the first virtual private community, in 480.

Figure 5:
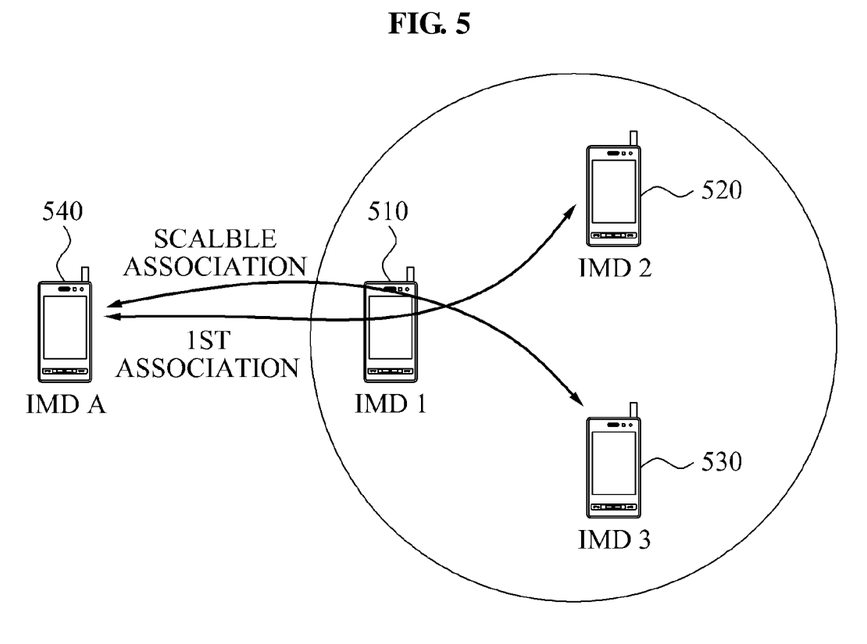
FIG. 5 is a diagram illustrating an example of a self-secure association.

FIG. 5 illustrates an example of a self-secure association.

Referring to FIG. 5, when a communication device newly joins a virtual private community, it may not need to perform association with all of the members of the virtual private community.

For example, a communication device 540 that newly joins the virtual private community may perform association with a single member in the virtual private community. By performing association with a single member, the communication device 540 may be automatically associated with all members in the virtual private community. The automatically performed association may be referred to as an auto and scalable association.

A communication device of an inviter (hereinafter, 'owner') configuring a virtual private community for the first time may generate a public key for the virtual private community to which the owner belongs. For example, a communication device 510 may be an owner of a second virtual private community, and communication devices 520 and 530 may correspond to other members of the second virtual private community.

The owner 510 may share a public key with the communication devices 520 and 530 such that members of the second virtual private community may recognize the owner 510. To share the public key for recognizing the owner 510, the owner 510 may transmit the public key to the communication devices 520 and 530 via an authorized channel.

The communication devices 520 and 530 may verify whether the information transferred to them is transferred from a proper owner (for example, the owner 510 of the second virtual private community to which the communication devices 520 and 530 belong in FIG. 5) using the public key. For example, the communication devices 520 and 530 may verify whether a signature of the corresponding information belongs to the owner 510, using the public key. By sharing the public key of the owner 510 with the communication devices 520 and 530, they may be verified as members of the virtual private community.

Each of the members of a predetermined virtual private community may be linked with the owner 510 through the public key. Thus, a member corresponding to the communication device 540 that newly joins the virtual private community may perform association with the owner 510 once, and be automatically associated with other members corresponding to the communication devices 520 and 530 in the virtual private community.

In this example, the member corresponding to the communication device 540 newly joining the virtual private community may perform association with the owner 510 once, and be automatically associated with the other members corresponding to the communication devices 520 and 530 in the same virtual private community without performing associations with each respective member.

As another example, instead of the owner 510, the communication device 540 may perform association with another member such as the communication devices 520 and 530 in the virtual private community.

The communication devices 520 and 530 in the virtual private community may be linked to a credential of the owner 510, and thus, a communication device may be associated with the owner 510 without directly performing association with the owner 510. When the owner 510 and the communication devices 520 and 530 in the virtual private community perform association with each other, they may provide information about the members of the virtual private community to each other. For example, the information may include the hierarchical content name, the virtual community identifier, and the like, included in themselves. The information may be used for an automatic association between an owner and other members, and a content routing between virtual private communities.

Figure 6:
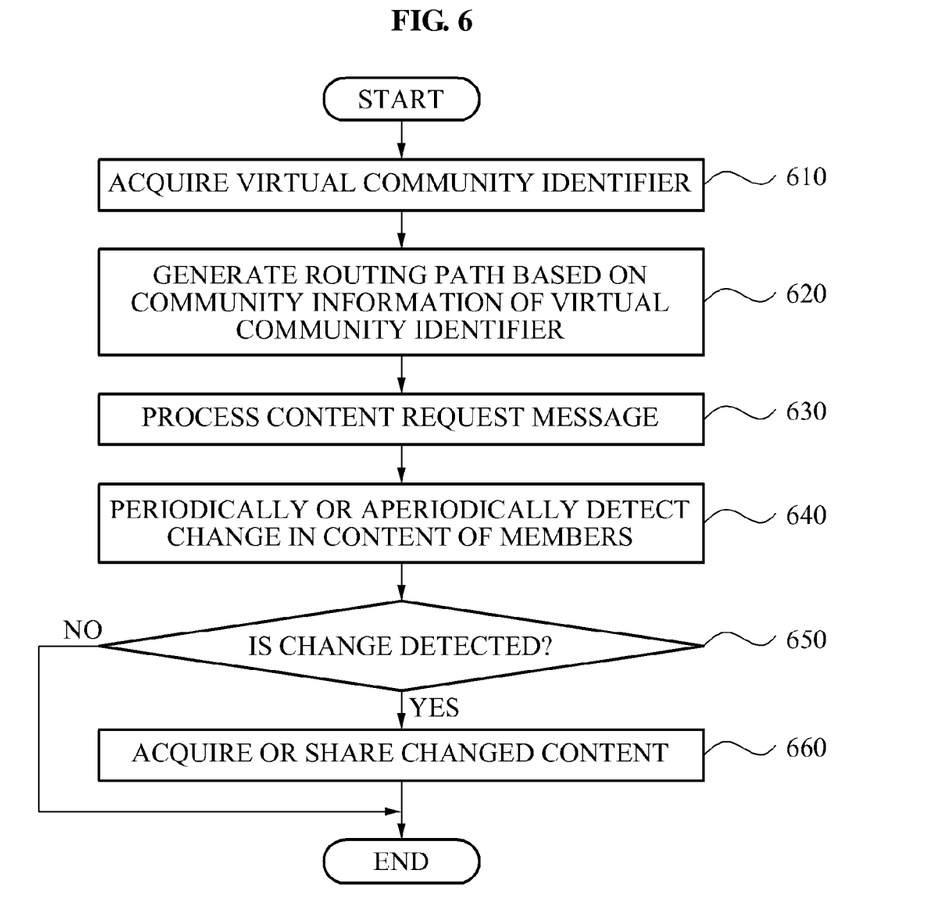
FIG. 6 is a flowchart illustrating an example of a method of a hub for a virtual private community.

FIG. 6 illustrates an example of a method of a hub for a virtual private community.

Referring to FIG. 6, in 610, the hub in the virtual private community acquires a virtual community identifier of each of a first virtual private community and a second virtual private community. For example, the virtual private community may include the first virtual private community for a predetermined user that has at least one communication device and the second virtual private community as a higher level community in comparison to the first virtual private community. Members of the second virtual private community may share a content sharing service and/or social networking service.

In the above-mentioned home unit virtual private community, the hub may form the virtual private community, may perform member management, may perform content management of a member, and the like. The hub may transmit the public key to the members of the second virtual private community to enable the members to recognize the hub. For example, the hub may transmit the public key via an authorized channel.

The hub may correspond to a predetermined communication device in the virtual private community as opposed to a separate device. In this example, the hub may generally be connected to a broadband convergence network, and may correspond to a communication device that is constantly operating on an on state.

The members that belong to the virtual private community may communicate with an external source through the hub as the center, or may communicate with the external source directly instead of relying on the hub.

As another example, instead of acquiring the virtual community identifiers as described in 610, the hub may generate the virtual private communities as well as the virtual community identifiers.

In 620, the hub generates a routing path between a communication device that has the content and a communication device that requests the content, using community information that is included in the virtual community identifier. In this example, the hub may perform the role of a router in the virtual private community and a communication device may more easily exchange routing information, and the like, through the hub.

The hub may perform tunneling so that members of second virtual private community may communicate with members of other second virtual private communities. For example, the hub may provide a tunnel between members of a virtual private community and a communication device outside of a local connection area of the virtual private community to which the communication device belongs and thereby configure a communication environment. In various aspects, the hub may form the virtual private community, may perform member management, may perform content management of the member, and the like.

In 630, the hub processes a content request message that is received from a communication device or members included in each virtual private community, using the virtual community identifiers of virtual private communities. For example, the hub may process the content request message using the routing path generated in operation 620.

In 640, the hub periodically or aperiodically detects a change in the content included in the members of the second virtual private community.

In response to the change in the content included in the members of the second virtual private community being detected, in 650, the hub acquires the changed content, or causes the members of the second virtual private community to share the changed content, in 660.

As described herein, the hub may manage information about members of the second virtual private community, and information about the content included in the members of the second virtual private community. The hub may exchange communication environment information with other virtual private communities that are outside of the second virtual private community to perform a communication. For example, the communication environment information may include information about a name of the virtual private community, the virtual community identifier, the content included in the virtual private community, and the like.

The hub may perform at least one of a synchronization, a push, and a content search, with the members of the second virtual private community. In some examples, the virtual private community may further include a third virtual private community as a higher level community than that of the second virtual private community. In this example, members of the third virtual private community may perform association through a predetermined communication device, and may share information about the second virtual private communities.

If the virtual private community includes the third virtual private community, the hub may acquire the virtual community identifiers of the first, second, and third virtual private communities, and the hub may process a content request received from a communication device and/or received from members included in each virtual private community using the virtual community identifier of each of the first, second, and third virtual private communities.

To process the above-mentioned content request, the hub may perform association with a communication device that has the content using the virtual private identifier of each of the first, second, and third virtual private communities. To process the above-mentioned content request, the hub may generate the routing path between a communication device that has the content and a communication device that requests the content, using the virtual community identifier of each of the first, second, and third virtual private communities.

As described herein, a virtual private community network may include one or more communication devices and at least one hub. A communication device in the network may generate a hierarchical content name using a content name and a virtual community identifier that indicates a hierarchical structure of first, second, and third virtual private communities. The hub may process the content request received from a communication device using the hierarchical content name.

Figure 7:
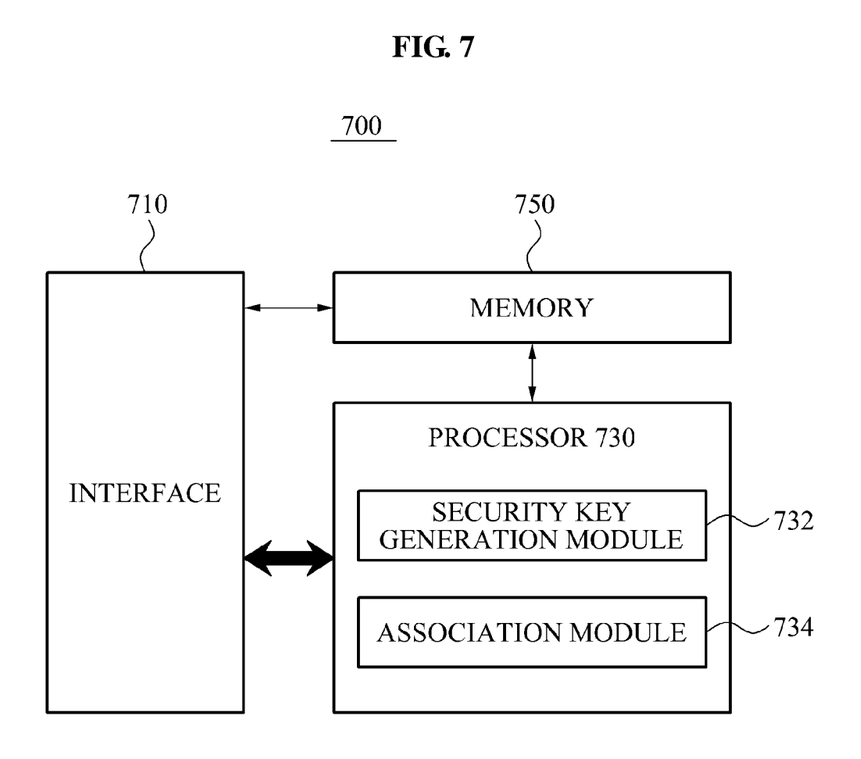
FIG. 7 is a diagram illustrating an example of a communication device for a virtual private community.

FIG. 7 illustrates an example of a communication device for a virtual private community.

Referring to FIG. 7, communication device 700 communicating in the virtual private community includes an interface 710, a processor 730, and a memory 750. The virtual private community may include a first virtual private community for a predetermined user that owns one or more communication devices. The interface 710 may receive a unique virtual community identifier indicating a hierarchical structure of the first virtual private community from a communication device that is included in the first virtual private community.

The processor 730 may generate a hierarchical content name using the virtual community identifier of the first virtual private community and a content name included in the communication device. The memory 750 may store the virtual community identifier and the hierarchical content name.

The virtual private community may further include a second virtual private community that is a higher level community in comparison to the first virtual private community. In this example, members of the second virtual private community may share a content sharing service and/or social networking service. If the virtual private community includes a second virtual private community, the interface 710 may receive the unique virtual community identifier indicating the hierarchical structure of each virtual private community from a communication device that is included in the first and second virtual private communities.

For example, the processor 730 may generate a hierarchical content name using the virtual community identifier of each of the first and second virtual private communities, and the content name included in the communication device included in the first and second virtual private communities. The processor 730 may generate the virtual community identifier of each of the first virtual private community and the second virtual private community. The hierarchical content name may hierarchically include the virtual community identifier of each of the first and second virtual private communities, and the content name. In the example of FIG. 7, the processor 730 includes a security key generation module 732 and an association module 734.

For example, the security key generation module 732 may generate a public key for the first virtual private community, and generate a security key of the first virtual private community based on the public key. If the communication device is a communication device of a member that belongs to the first virtual private community, the second virtual private community, or the third virtual private community, the communication device may generate the public key and the security key for the corresponding virtual private community.

The security key generation module 732 may provide the public key or the security key to a single member of a virtual private community that requests association with the communication device. The association module 734 may perform a self-secure association with the single member using the security key. The single member that performs association with the communication device may automatically be associated with the other members of the virtual private community including the communication device, and thus, the member may not need to further perform the association.

The memory 750 may store the virtual community identifier and hierarchical content name. Because the memory 750 may store the public key and the security key generated in the security key generation module 732, the processor 730 may provide the stored the public key and the security key to the single member requesting the association with the communication device.

Figure 8:
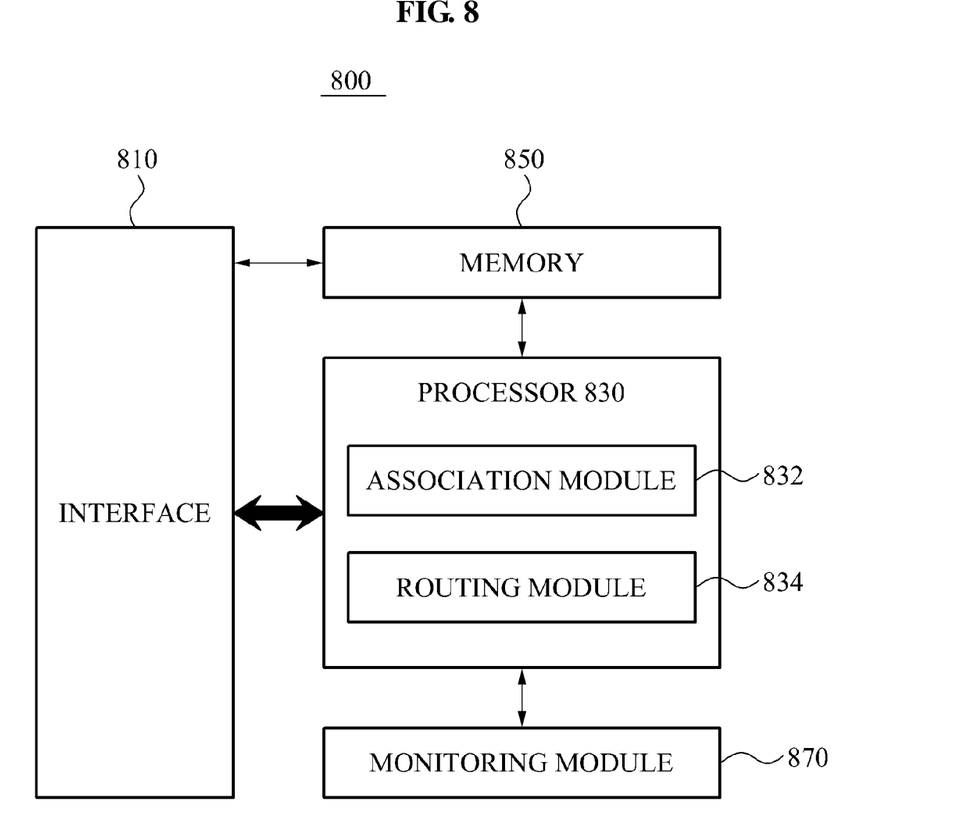
FIG. 8 is a diagram illustrating an example of a hub for a virtual private community.

FIG. 8 illustrates an example of a hub for a virtual private community.

Referring to FIG. 8, the hub 800 includes an interface 810, a processor 830, and a memory 850. The hub 800 may further include a monitoring module 870. In this example, the virtual private community may include a first virtual private community for a predetermined user that has one or more communication devices, and a second virtual private community that is a higher level community in comparison to the first virtual private community. In this example, members of the second virtual private community may share a content sharing service and/or social networking service.

The interface 810 may receive a unique virtual community identifier indicating a hierarchical structure of each virtual private community from a communication device included in the first and second virtual private communities. The interface 810 may transmit a public key to members of the second virtual private community via an authorized channel. The public key enables the members to recognize the hub 800. The interface 810 may exchange communication environment information with other virtual private communities that are outside of the second virtual private community to communicate with them. For example, the communication environment information may include information about a virtual community identifier and a content included in the member of the virtual private community.

The processor 830 may process a content request received from a communication device, using the hierarchical content name. In the example of FIG. 8, the processor 830 includes an association module 832 and a routing module 834. The association module 832 may perform an association with a communication device that has the content, using the virtual community identifier of each of the first and second virtual private communities. The routing module 834 may generate a routing path between the communication device that has the content and the communication device that requests the content, using the virtual community identifier.

The processor 830 may perform at least one of a synchronization, a push, and a content search, with the members of the second virtual private community. For example, the processor 830 may manage information about the members of the second virtual private community, and information about the content included in the members of the second virtual private community.

The memory 850 may store the virtual community identifier. The monitoring module 870 may periodically or aperiodically detect a change in content that is included in the members of the second virtual private community. If the change in the content is detected by the monitoring module 870, the processor 830 may acquire the changed content from the members of the second virtual private community, or cause the members of the second virtual private community to share the changed content. In various examples, the monitoring module 870 may be included in the processor 830.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/communication device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a to global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for generating a user-oriented virtual private community, the method comprising:
generating, with a processor, a first virtual private community for a predetermined user comprising at least one communication device of the predetermined user; and
generating, as a higher level community in comparison to the first virtual private community, a second virtual private community including the first virtual private community as a member, wherein the first and second virtual private communities each have a unique virtual community identifier the at least one communication device included in the first virtual private community generates a hierarchical content name using the virtual community, identifier of each of the first and second virtual private communities, and a content name included in the at least one communication device, and the hierarchical content name comprises the virtual community, identifier of each of the first and second virtual private communities, and the content name included in the at least one communication device, wherein the at least one communication device performs association with another communication device in the first virtual private community using a security key generated based on a public key.

2. The method of claim 1, wherein the second virtual private community further includes another first virtual private community corresponding to a user authorized by the predetermined user.

3. The method of claim 2, wherein the members of the second virtual private community share a content sharing service or a social networking service.

4. The method of claim 2, further comprising:
generating a third virtual private community including the second virtual private community and another second virtual private community as members.

5. The method of claim 4, wherein the first virtual private community, the second virtual private community, and the third virtual private community each have a unique virtual community identifier.

6. The method of claim 5, wherein:
the at least one communication device included in the first virtual private community generates a hierarchical content name using the virtual community identifier of each of the first virtual private community, the second virtual private community, and the third virtual private community, and a content name included in the at least one communication device, and the hierarchical content name comprises the virtual community identifier of each of the first virtual private community, the second virtual private community, and the third virtual private community, and the content name included in the at least one communication device.

7. The method of claim 4, wherein a new communication device joins at least one of the first virtual private community, the second virtual private community, and the third virtual private community, and performs association using the public key and the security key.

8. The method of claim 4, further comprising:
generating, by the predetermined user, a fourth virtual private community that is hierarchically independent of the second virtual private communities and the third virtual private community.

9. The method of claim 8, further comprising:
generating, by members of the fourth virtual private community, a public key for the fourth virtual private community; and
generating, by the members of the fourth virtual private community, a security key for the fourth virtual private community, using the public key for the fourth virtual private community.

10. A non-transitory computer-readable storage medium having stored therein program instructions to cause a processor to implement a method for generating a user-oriented virtual private community, the method comprising:
generating a first virtual private community for a predetermined user comprising at least one communication device of the predetermined user; and
generating, as a higher level community in comparison to the first virtual private community, a second virtual private community including the first virtual private community as a member, wherein the first and second virtual private communities each have a unique virtual community identifier, the at least one communication device included in the first virtual private community generates a hierarchical content name using the virtual community identifier of each of the first and second virtual private communities, and a content name included in the at least one communication device, and the hierarchical content name comprises the virtual community identifier of each of the first and second virtual .private communities, and the content name included in the at least one communication device, wherein the at least one communication device performs association with another communication device in the first virtual private community using a security key generated based on a public key.

* * * * *